United States Patent

Jorgensen

[15] 3,688,284

[45] Aug. 29, 1972

[54] TRANSISTOR RECORDING CIRCUIT WITH COMMUTATOR

[72] Inventor: Pierre Jorgensen, A L'Hay-les-Roses, France

[73] Assignee: Saint-Gobain Techniques Nouvelles, Courbevoie, Seine, France

[22] Filed: Jan. 7, 1970

[21] Appl. No.: 6,005

Related U.S. Application Data

[62] Division of Ser. No. 624,877, March 21, 1967, Pat. No. 3,544,780.

[30] Foreign Application Priority Data

March 21, 1966 France......................6698430

[52] U.S. Cl.........................340/174.1 H, 179/100.25

[51] Int. Cl...............................................G11b 5/02

[58] Field of Search.340/174.1 G, 174.1 H, 174.1 A; 179/100.2 S

[56] References Cited

UNITED STATES PATENTS

| | | | |
|---|---|---|---|
| 3,034,111 | 5/1962 | Hoagland et al. | ....340/174.1 A |
| 3,037,200 | 5/1962 | Mellott | ...............340/174.1 G |
| 2,900,215 | 8/1959 | Schoen | ...............340/174.1 G |
| 2,875,429 | 2/1959 | Quade | .................340/174.1 F |
| 3,217,183 | 11/1965 | Thompson et al. | .340/174.1 H |
| 3,246,219 | 4/1966 | Devol et al. | ..........340/174.1 F |
| 3,290,487 | 12/1966 | Scott | ...................340/174.1 H |

*Primary Examiner*—Vincent P. Canney
*Attorney*—Dale A. Bauer, John L. Seymour and Bauer and Seymour

[57] ABSTRACT

An electronic multiplier for producing an algebraic product comprising means for selectively recording a series of positive dipoles and negative dipoles with blank zones on a mobile information memory track and a corresponding series of either positive or negative dipoles on a mobile reference memory track and means for simultaneously reading and converting to electrical signals successive dipoles (or zones) on the information track and successive dipoles on the reference track and for effecting the product of said signals, wherein the recording on the information memory track is effected by apparatus including a transistorized comparer connected with a transistorized commutator.

5 Claims, 19 Drawing Figures

INVENTOR
PIERRE JORGENSEN
BY
Bauer and Seymour
ATTORNEYS

FIG. 3
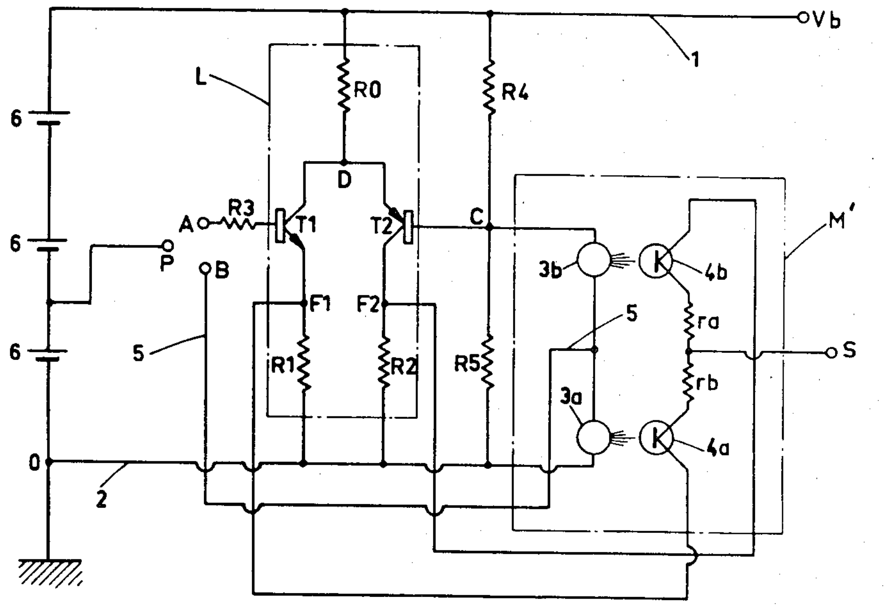
FIG. 5
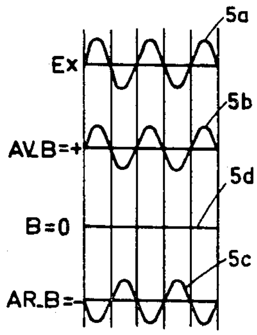
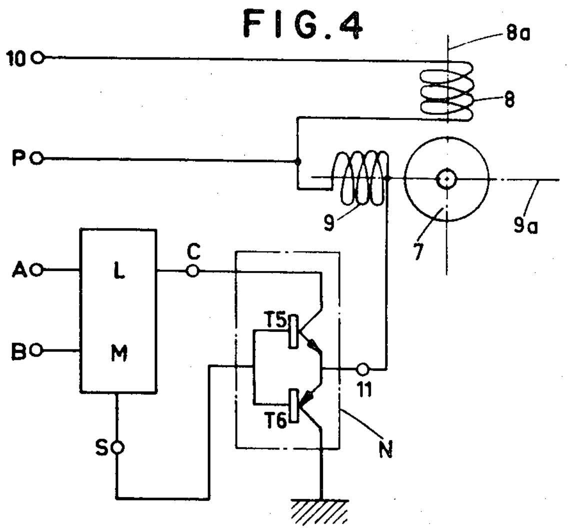
INVENTOR
PIERRE JORGENSEN
BY
Bauer and Seymour
ATTORNEYS INVENTOR
PIERRE JORGENSEN
BY
Bauer and Seymour
ATTORNEYS INVENTOR
PIERRE JORGENSEN
BY
Bauer and Seymour
ATTORNEYS INVENTOR
PIERRE JORGENSEN
BY
Bauer and Seymour
ATTORNEYS INVENTOR
PIERRE JORGENSEN
BY
Bauer and Seymour
ATTORNEYS

TRANSISTOR RECORDING CIRCUIT WITH COMMUTATOR

This application is a division of application Ser. No. 624,877, filed Mar. 21, 1967, for "Electrical Apparatus" (now U.S. Pat. No. 3,544,780).

The present invention relates to electrical apparatus and more particularly to solid state conduction control circuitry adapted, among other things, for use in electronic calculators and the like.

An object of the present invention is to provide a novel scalar multiplier circuit.

Another object is to provide novel solid state electronic circuitry adapted for producing the algebraic product of two quantities representable by electrical values.

A further object is to provide a novel electronic scalar multiplier for producing an algebraic product of two numbers in strict fashion when one of the numbers is quantified according to two or three values, such as, for example, positive (+), without value (0) and negative (−) and in approximate fashion for those quantifications of a higher order.

Still another object of the invention is to provide a novel phase demodulator embodying multiplier circuitry of the above character.

Still another object of the invention is to provide an electronic multiplier circuit of the above character in novel combination with a magnetic memory device.

The basic multiplier circuit contemplated by the invention comprises a device embodying two transistors or comparable conduction control means capable of delivering on two output electrodes voltages representative of the positive and negative of a number A if a voltage representing the number is applied to an input terminal of the device. Connected to said device is a commutator circuit having an output terminal, a control terminal for receiving a signal indicative of a number B and two input terminals connected to the output terminals of said device. The commutator circuitry is such that if B is positive, the commutator output is connected by a solid state switch to the commutator input electrode which receives a voltage representative of the number A, whereas if B is negative, the commutator output electrode is connected by a solid state switch with the commutator input terminal thereof which receives a voltage signal representing the number −A. Finally, if B is without value, both input terminals of the commutator will be connected to each other and with the output terminal thereof. Thus, for the values of input signals A and B given in the following table, the commutator output voltage $V_S$ will be as indicated in the corresponding vertical column.

| | | | |
|---|---|---|---|
| A | − 0 + | − 0 + | − + |
| B | − − − | 0 0 0 | + + + |
| $V_s$ | + 0 − | 0 0 0 | − 0 + |

IT will be noted that the sign of the voltage $V_S$ corresponds to the product of the signs of the input signal voltages A and B.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings,

FIG. 3 is a circuit diagram showing a second embodiment;

FIG. 4 is a diagram illustrating the combination of the apparatus of FIGS. 1 or 2 with a two-phase control motor;

FIG. 5 is a graphic illustration of typical input and output voltages of apparatus embodying the invention;

Figure 1:
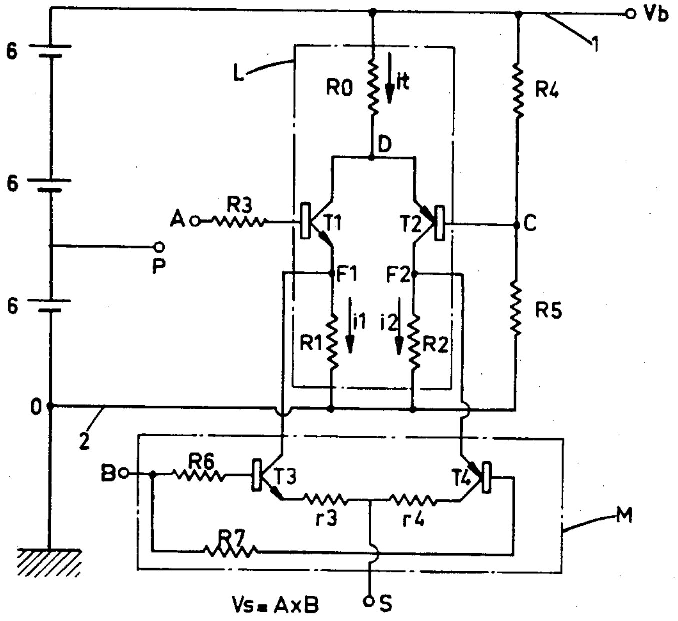
FIG. 1 is a circuit diagram illustrating one embodiment of the invention.
Figure 9:
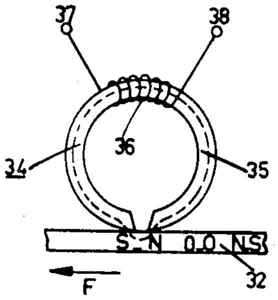
FIG. 9 is a diagrammatic detail view of a recording track and a reading head therefor.
Figure 7:
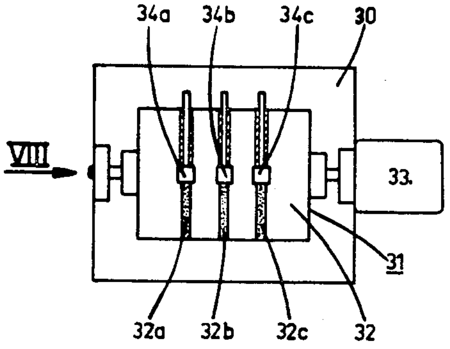
FIG. 7 is a diagrammatic plan view of a magnetic memory device.
Figures 10A, 10B, 10C, 10D, 10E, 10F, 10G:
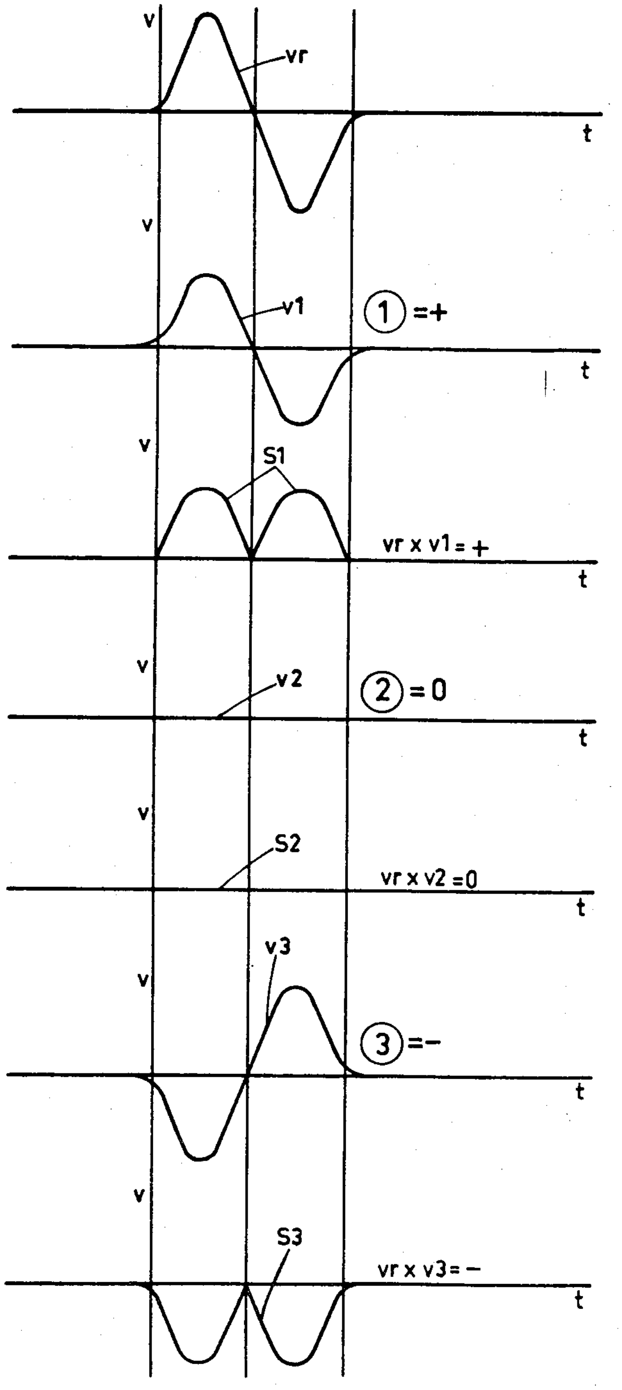
Figures 11, 13:
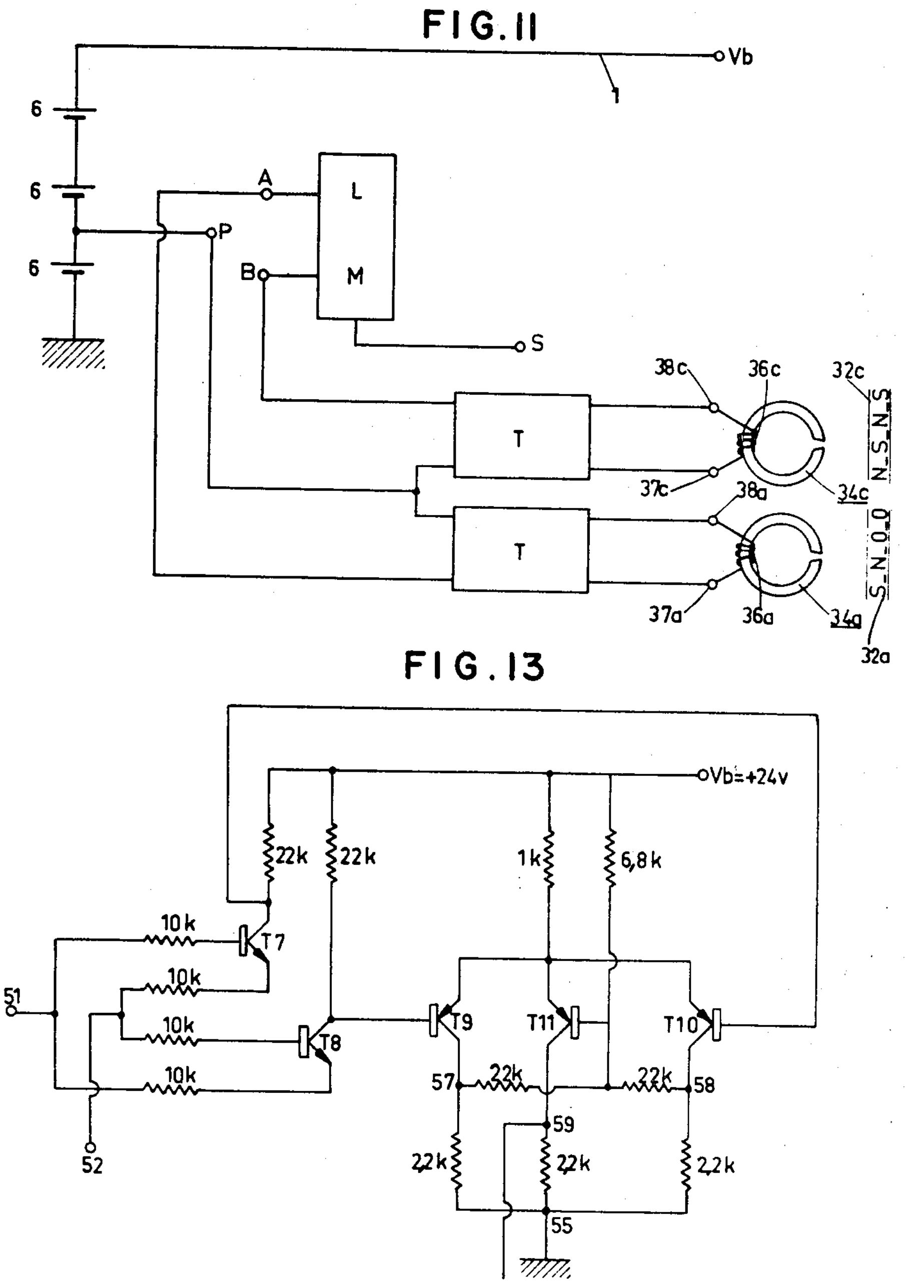
Figure 12:
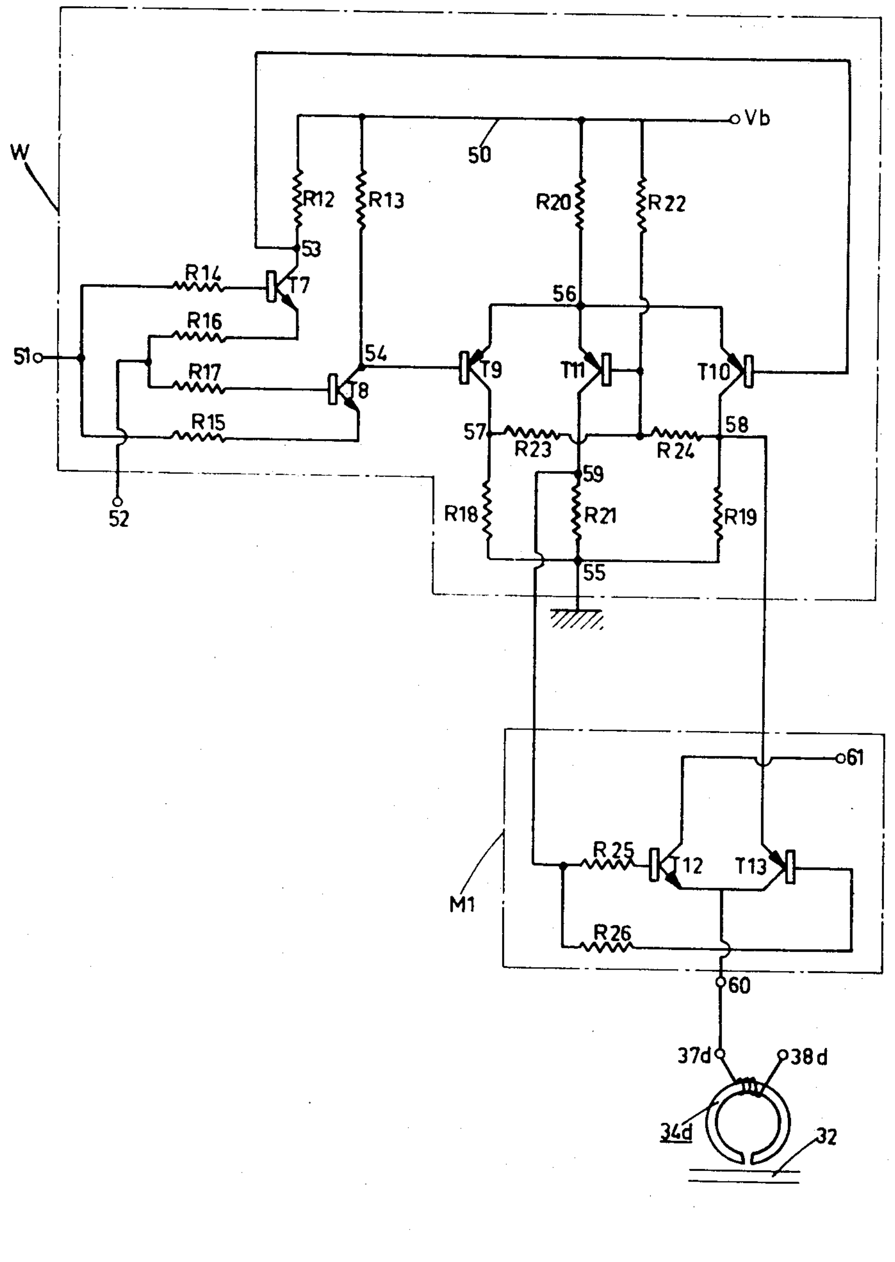

FIGS. 10 A, 10 B, 10 C, 10 D, 10 E, 10 F and 10 G are respectively graphic representations of voltage plotted against time of a reference signal that can be taken from the reading head of FIG. 9, a signal representing the positive state, the product of those two signals, a signal representing the No Value state, the product of that signal and the reference signal, a signal representing the negative state and the product of that signal and the reference signal;

FIG. 11 is a diagram showing memory device reading heads in combination with circuitry shown in FIG. 1;

FIG. 12 is a diagram of circuitry adapted for recording signals on the memory track of the device of FIG. 7; and FIG. 13 is a duplicate of a portion of the diagram of FIG. 12 wherein exemplary values of some of the components are indicated.

Figure 2:
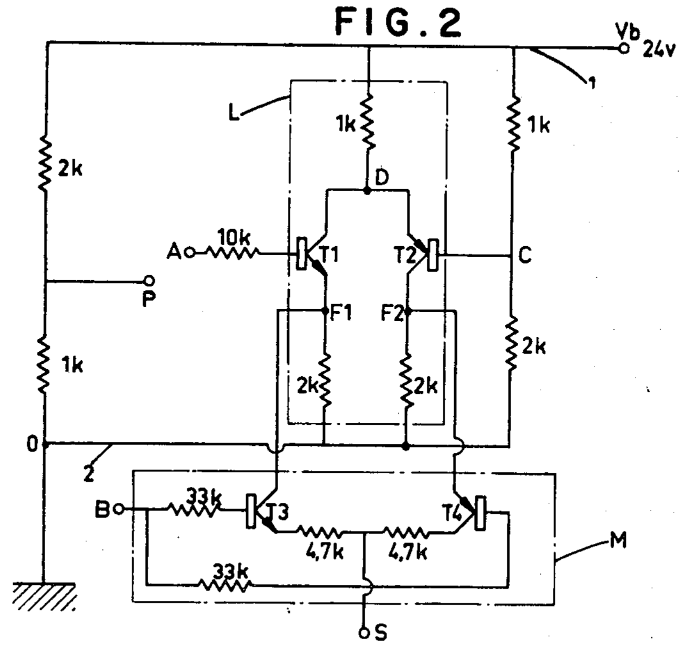
FIG. 2 is a duplicate of FIG. 1 wherein exemplary values of some of the components are indicated.
Figure 6:
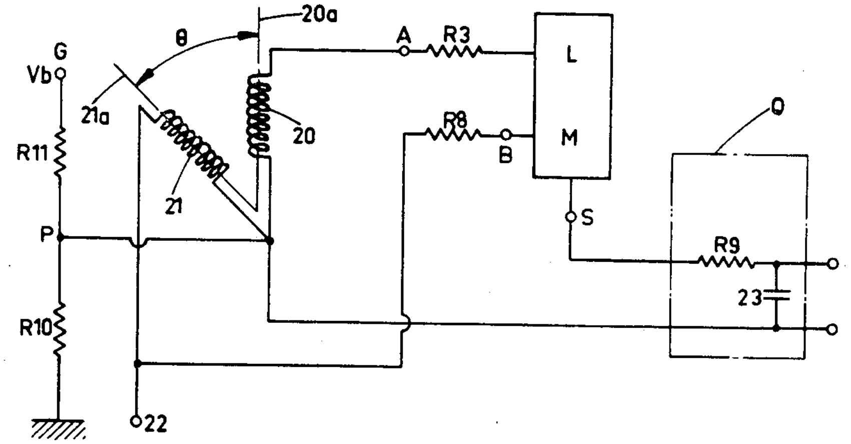
FIG. 6 illustrates a phase demodulator embodying the circuitry of FIG. 1.

One embodiment of the present invention is illustrated in FIGS. 1 and 2, by way of example, as including a two-transistor device L comprising an NPN type transistor T1 and a PNP type transistor T2 which may be transistors known commercially as Texas Instruments Company types 1.305 and 1.306. Each of said transistors has collector, emitter and base terminals or electrodes. Electrical energy is supplied to the transistors by a suitable source such as a 24-volt battery through a circuit comprising conductors 1 and 2. The voltage on conductor 1 may be designated Vb and that on conductor 2 may be zero or ground potential. Conductor 1 is connected to the collector terminal of transistor T1 and the emitter terminal of transistor T2 through a resistor RO at a junction D. Conductor 2 is connected to the emitter terminal of transistor T1 through a resistor R1 and junction point F1 and to the collector terminal of transistor T2 through a resistor R2 and a junction point F2, said resistors being of equal value. The base terminal of transistor T1 is connected to a signal input terminal A through a resistor R3, and the base terminal of transistor T2 is connected at a junction point C, between resistors R4 and R5 which are connected in series between conductors 1 and 2. A terminal P is also connected to conductor 1 between resistances (FIG. 2) or other voltage dividing or distributing means 6 (FIG. 1). Corresponding resistors in FIG. 6 are designated R10 and R11. The supply voltages at points D, F1 and F2 may be designated $V_D$, $V_{F1}$, and $V_{F2}$, respectively. Likewise, the voltage at point C, predetermined by the components R4 and R5 may be designated $V_C$.

The points F1 and F2 are output terminals of the device L and are connected in the embodiment of FIG. 1 to input terminals of a commutator circuit M. The latter comprises two solid state conduction control devices which in the form shown are an NPN type transistor T3 and a PNP type transistor T4, each transistor having collector, emitter and baseelectrodes or terminals. The collector terminal of T3 is connected to terminal F1, and the emitter terminal of transistor T4 is connected to terminal F2. A signal input terminal B is connected to the base terminals of transistors T3 and T4 through resistors R6 and R7, respectively. The emitter terminal of transistor T3 and the collector terminal of transistor T4 are connected through equal resistors *r*3 and *r*4 respectively, to a single commutator output terminal S.

In the following description of the operation of the combined circuits L and M, it is assumed that resistance components thereof have the values indicated for corresponding components in FIG. 2 or other values in the same proportion. In particular, R1 is equal to R2, R6 is equal to R7, and *r*3 is equal to *r*4. It will be seen that by reason of the PN junction at transistor T2, the voltage $V_D$ at point D will be equal to the voltage $V_C$ at point C, and by reason of the NP junction at transistor T1 the voltage $V_{F1}$ at terminal F1 is equal to the voltage $V_A$ at input terminal A. Also, the intensity of the current I1 traversing resistance RO is equal to the sum of the current I1 and I2 traversing the resistors R1 and R2, respectively.

The constancy of the current I1, resulting from the fact that the ends of resistance RO are at predetermined potentials $V_b$ and $V_C$, brings about the constancy of the sum of currents I1 and I2, equal respectively to $V_{F1}$/R1 and $V_{F2}$/R2, and hence the constancy of the sum $V_{F1} + V_{F2}$, the value of which may be designated by $2V_p$, where $V_P$ is the potential at point P. $V_{F1}$ and $V_{F2}$ are consequently equal to the sum and the difference, respectively, of $V_P$ and $V_A$:

$$V_{F1} = V_P + V_A$$
$$V_{F2} = V_P - V_A$$

This sum and this difference are obtained by applying the voltage $V_A$ between the point A and the point P of potential VP.

If a voltage $V_B$ is established between terminal B and point P, the voltage $V_S$ at output terminal S will have a value greater than $V_P$ if the voltage $V_B$ is positive, and a value less than $V_P$ if the voltage $V_B$ is negative. When the voltage $V_B$ is positive, the potential of the base of transistor T3 is greater than the potential of its emitter electrode, and when voltage $V_B$ is negative, the potential of the base of transistor T4 is less than the potential of its collector electrode. When no voltage is applied at B, that is, when $V_B$ is without value, transistors T3 and T4 are both blocked if $V_A$ is positive. In that case, the potential of the base electrode of transistor T3 will be less than the potential of its collector and emitter electrodes, and the potential of the base of transistor T4 will be greater than the potentials of its emitter and collector electrodes. Consequently, terminals S, B and P will all be at the same potential. If, on the other hand, $V_A$ is negative when $V_B$ is without value, transistors T3 and T4 become conductive and by reason of the equality of current limiting resistors *r*3 and *r*4, the potential of the terminal S is still at the potential level of the point P. From the foregoing, the following table may be formulated for the values of voltages at points A, B and S, wherein the signs +, 0 and − symbolize, respectively, a voltage greater than $V_P$, a voltage equal to $V_P$, and a voltage less than $V_P$.

| | | | |
|---|---|---|---|
| A | − 0 + | − 0 + | − 0 + |
| B | − − − | 0 0 0 | + + + |
| $V_S$ | + 0 − | 0 0 0 | − 0 + |

It will thus be seen that the voltage $V_S$ in each vertical column is the product of the signs of A and B in the same column, the module of this product being equal to at least the modules of A and B.

In a preferred embodiment, as shown in FIGS. 1 and 2, resistance RO is given a value R/2 and resistances R4 and R5 are given values proportional to R/2 and to R, respectively. For example, RO may have a value of 1 *k* when R4 has the same value and R5 has a value of 2 *k* as indicated in FIG. 2. When the elements 6 are resistors with the values indicated in FIG. 2, the point P is brought to a potential $V_b/3$. Accordingly, the three potentials, $2V_b/3$, $V_b/3$ and 0, represent the values +, 0 and − in the table above.

The embodiment of the invention illustrated in FIG. 3 is identical with FIG. 1, except that the two-transistor commutator M is replaced by apparatus M' comprising two vibration emitters 3*a* and 3*b* connected in series between point C and Conductor 2 with a center tap 5 connected to control terminal B. Vibration receivers 4*a* and 4*b*, the electrical characteristics of which vary under action of the vibrations of the corresponding vibration emitter, have the input terminals thereof connected respectively to terminals F1 and F2. The output electrodes or terminals of receivers 4*a* and 4*b* are connected to the common output terminal S by resistances *rb* and *ra*, respectively. Vibration emitters 3*a* and 3*b* may be discharge tubes, such as non-polarized gaseous discharge tubes, Hertzian radiating oscillators or electric or electro-magnetic vibrators. The corresponding receivers 4*a* and 4*b* may be photo-electric resistances, transistors having bases equipped with antennae or carbon granule microphones.

The operation of the embodiment of FIG. 3 is as follows:

When receiver 4*a* is rendered conductive by vibration emitter 3*a*, the potential $V_{F1}$ will be applied to output electrode S. When receiver 4*b* is rendered conductive by vibration emitter 3*b*, the potential $V_{F2}$ is applied to terminal S. When both receivers are rendered conductive, the potential $V_P$ is applied to electrode S, the current limiting resistors *ra* and *rb* being of equal value. For rendering either or both of the receivers conductive, one may apply between terminals B and P a control voltage $V_B$ quantified into the value $V_C - V_P$ to energize vibration emitter 3*a*, the value $-V_P$ to energize vibration emitter 3*b*, and the value $(V_C/2) - V_P$ to simultaneously energize both emitters 3*a*, and 3*b*.

When one of the control voltages, for example, $V_A$, is an alternating current voltage, the output voltage $V_S$ which will also be alternating will be either in-phase or out-of-phase or null (without value) in relation to $V_A$, depending upon whether $V_B$ is positive, negative or without value. In this case, the output voltage $V_S$ may be used to control the operation and direction of rotation of a two-phase electric motor, for example a step-by-step motor type U510 of the Societe de la Radiotechnique or an asynchronous two-phase motor as illustrated in FIG. 4.

The motor as illustrated by way of example comprises a rotor 7 which may be caused to rotate in either direction by two fixed windings 8 and 9 mounted with their axes 8*a* and 9*a* perpendicular to each other. The windings are connected in series between terminals 10 and 11 and connected by a center tap to terminal P. If the terminals 10 and P are connected across a source (not shown) of alternating current voltage E, the rotor 7 will rotate in a forward direction, a reverse direction or stop, depending upon whether one applied between terminals 11 and P a voltage E*x* (FIG. 5) out-of-phase by $\pi/2$ in relation to voltage E (curves 5*a* and 5*b*), a voltage E*x* out-of-phase by $\pi/2$ in relation to E (curve 5*c*), or no voltage (curve 5*d*), respectively. These voltage variations between terminals 11 and P may be obtained by inserting between these terminals a multiplier circuit L,M as above described, the terminals A and B of which are supplied, for example, with alternating current voltages of maximum and minimum values ($2V_b/3$) and 0, and control voltages ($2V_b/3$), $V_b/3$ and 0. If desirable or necessary, terminal 11 may be connected to output terminal S of the multiplier L,M through suitable amplifying means, such as a push-pull amplifier N embodying transistors T5 and T6 of type NPN and PNP.

As illustrated in the novel embodiment of FIG. 6, the voltages $V_A$ and $V_B$ may both be alternating current voltages. Voltage $V_B = V_O \sin\omega t$, having a maximum value $V_O$ and a frequency $\omega$ applied between terminal 22 and terminal P of a multiplier circuit L,M as well as to the ends of winding 21 of a selsyn rotor and to point B of the multiplier circuit through a resistor R8, generates in stator coil winding 20 connected between terminals P and A a voltage $V_A = V_O \cos\theta \sin\omega t$ proportional to the cosin of the angle $\theta$ between the axes 20*a* and 21*a* of windings 20 and 21. On output terminal S one receives a voltage signal proportional to cosin $\theta$ and to $\sin^2\omega t$ allowing an average value proportional to cosin $\theta$, this average value being obtained by employing a filter Q comprising a resistor H9 and a condenser 23. It will be noted that point P is, for example, brought to a potential $V_b/3$ when it is connected with appropriate resistors R 10 and R 11 in the manner shown between the mass or ground and terminal G of potential $V_b$, an alternating current voltage of maximum value ($2V_b/3$) being applied between points 22 and P.

It will be apparent that the novel circuit contemplated by the invention also makes it possible to determine whether two numbers are of the same sign and not valueless, whether they are contrary signs and not valueless or whether one of them is valueless. The product of the two numbers is positive if both numbers are positive; the product is negative if the numbers have contrary signs, and it is valueless if either number is valueless. The distinction between these values may be made by a known comparison circuit of scalar values, such as that disclosed in French Pat. No. 1,478,391.

Additionally, the circuit embodying the invention may serve to take a predetermined fraction of a value or of a voltage, to inverse that value or that voltage, to calculate the square of that value, etc. One of its most important applications, however, consists of a magnetic coated dynamic memory tape or track presenting three states: a state of positive magnetization, a state of demagnetization and a state of negative magnetization.

Figure 8:
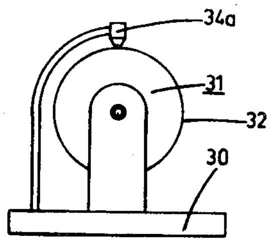
FIG. 8 is an end elevation view of the device of FIG. 7 looking in the direction of the arrow VIII.

As illustrated in FIGS. 7 and 8 one form of dynamic memory device of this type includes a base 30 on which a drum 31 with a magnetizable coating 32 is rotatably mounted. Suitable power means 33 are provided for rotating drum 31 relative to fixed reading heads 34*a*, 34*b* and 34*c* also mounted on base 30. The reading heads are of known construction and may be made up of a magnetic circuit or split core 35 which carries magnetic flux and a coil or winding 36 having terminals 37 and 38 as shown in the enlargement of FIG. 9. The surfaces or tracks 32*a*, 32*b* and 32*c* of magnetic coating situated under the reading heads 34 may have the information signals +, 0 and − recorded thereon, respectively, in the form of positive dipoles N–S, demagnetized zones 0–O and negative dipoles S–N. When a memory track is moved in the direction of the arrow F in FIG. 9, relative to the reading head 34, a signal voltage *v* is generated at terminals 37,38 which varies, when plotted against time *t* as the abscissa, according to curves v1 (FIG. 10B) in response to the passage of a positive dipole zone N–S, according to curve v2 (FIG. 10D) in response to the passage of a demagnetized zone O–O and according to curve *v*3 (FIG. 10F) in response to the passage of a negative dipole zone S–N.

In order to distinguish a signal 0 or a series of 0 signals indicating absence of information on the memory track, it is necessary to provide a reference signal *vr* (FIG. 10A) which can be read by one of the reading heads. This may be accomplished as illustrated in FIG. 11 by associating reading head 34*c* with a memory track 32*c* on which a series of positive dipole zones N–S have been recorded. This results in the generation of a voltage signal *vr* at terminals 37*c*, 38*c*.

One can now obtain the product of the reference signal *vr* and the unknown signals recorded on another track, for example track 32*a*, by connecting terminals 37*a*,38*a* (FIG. 11) to terminals A and P preferably through a suitable amplifier T of known construction and connecting terminals 37*c*,38*c* to points P and B of a multiplier circuit L,M embodying the invention, preferably also through an amplifier T of known construction.

According to whether the unknown recorded signals are positive (+), valueless (0) or negative (−), the potential $V_S$ at output terminal S varies with time according to curves S1, S2 or S3 (FIGS. 10C, 10E and 10G), respectively, thus restoring the signals +, 0 and −.

One may, if desired, record a series of negative dipoles S–N on track 32*c* in order to obtain output signals $V_S$ having signs contrary to those recorded on track 32*a*, for example (FIG. 11).

For recording signals of the above nature on a magnetic track 32 of the coated drum 31, one may make use of a novel combination consisting of a comparator circuit W and a commutator circuit M1 (FIG. 12) which are disclosed in the aforementioned French Pat. No. 1,478,391 and in U.S. Pat. No. 3,411,019, respectively.

In the form illustrated comparison circuit W contains two transistors T7 and T8 of the same type, for example NPN, having collector, emitter and base terminals. The collector terminals of transistors T7 and T8 are connected by a conductor 50 and resistances R12 and R13, respectively, to a source of voltage $V_b$. The base of transistor T7 and the emitter of transistor T8 are connected through resistors R14 and R15, respectively, to a signal input terminal 51. The base of transistor T8 and the emitter of transistor T7 are connected through resistors R17 and R16, respectively, to a terminal 52. Connections are made at points 53 and 54 to connect the collectors of transistors T7 and T8 to the base terminals of two type PNP transistors T10 and T9, respectively. The collector terminals of transistors T9 and T10 are connected to a junction 55 through resistors R18 and R19, respectively, and the emitter terminals thereof are connected to a junction 56 which is also connected through a resistance R20 to conductor 50 and hence to the source of voltage $V_b$.

Another transistor T11 of the same type as transistors T9 and T10 has its emitter terminal connected to junction 56 and its collector terminal connected through a resistor R21 to a junction 55 which is in turn connected to the mass or ground. The base terminal of transistor T11 is connected through a resistor R22 to supply line 50 and through resistors R23 and R24 to junctions 57 and 58, respectively, and thence to the collectors of transistors T9 and T10.

The commutator circuit M1 comprises an NPN type transistor T12 and a PNP type transistor T13. An input terminal 59 is connected to the collector terminal of transistor T11 and through resistors R25 and R26 to the base electrodes of transistors T12 and T13, respectively. The collector terminal of transistor T12 is connected to a terminal 61, and the emitter terminal of transistor T13 is connected to junction 58 and hence to the collector terminal of transistor T10. The emitter terminal of transistor T12 and the collector terminal of transistor T13 are connected directly to an output terminal 60 and thence to one terminal *37d* (or *38d*) of the winding of a recording head *34d*, the construction of which is similar to the reading heads described above.

In the operation of the recording circuitry of FIG. 12, some signal voltages $V_1$, $V_2$ and $V_3$ representing the values +, 0 and − are supplied at terminal 51 while the points 52 and *38d* (or *37d*) are carried to voltage $V_2$, the point 55 is carried to voltage $V_3$ and the terminal 61 is carried to a high frequency (about 100 kilocycles) alternating current voltage having a mean value equal to $V_2$.

If the signal input at terminal 51 has a voltage $V_1$ greater than $V_2$, the voltage of the base terminal of transistor T7 becomes greater than the voltage of its emitter terminal, the voltage on the base terminal of transistor T8 becoming in turn less than that on its emitter terminal. The result is that transistor T8 is blocked, transistor T7 is conductive, and the potential of point 53 and of the base terminal of transistor T10 is lowered.

As this transistor becomes conductive while transistors T9 and T11 remain blocked, the potential $V_1$ of point 58 and of the emitter of transistor T13 becomes a simultaneously greater than the voltage $V_3$ at point 59 and on the base of transistor T13 which is saturated. The potential of terminal *37d* of the writing or recording head is then equal to $V_1$ for recording a positive (+) signal on the magnetic memory track 32.

When the signal applied to terminal 51 is a voltage $V_{3\ less\ than\ V_2}$, the voltage of the base of transistor T8 becomes greater than the voltage of its emitter, while the voltage of the base of transistor T7 becomes less than that of its emitter. The result is that transistor T7 is blocked, transistor T8 becomes conductive, and the potential at point 54 and the base of transistor T9 is lowered. Since transistors T10 and T11 remain blocked as do also the transistors T12 and T13, the voltage on terminal *37d* of the recording head is equal to $V_3$ for recording a negative (−) signal on the track 32.

Finally, when the signal applied to terminal 51 is a voltage $V_2$, both transistors T7 and T8 are blocked as are also transistors T9 and T10. On the contrary, T11 becomes conductive by virtue of the voltage divider bridge consisting of resistors R22, R23 and R24. The result is that transistor T12 becomes saturated, and the high frequency signal applied to input terminal 61 is applied to recording head terminal *37d*. The magnetic track below the recording head is thereby demagnetized to record a 0 signal.

It will be noted that resistances R22, R23 and R24, thanks to which the base of transistor T11 is placed under voltage, allow for establishing equal thresholds, fields or paths for the voltages applied to terminal 51, according to the invention.

The specific embodiment of the above described comparator circuit as shown in FIG. 13 with the specific component values shown indicates, for example, whether the voltage V applied to the input terminal 51 is equal to $V_2 \pm (V_b/6)$, greater than $V_2 + (V_b/6)$ or less than $V_2 - (V_b/6)$, the value $V_b/6$ being, for example, equal to 4 volts.

What is claimed is:

1. A dynamic memory and reading system of the type embodying writing heads and reading heads each outfitted with an electric winding, magnetic-layered or coated mobile component where signals may be recorded on and read from a data or information track and a reference track by applying electrical voltages to the writing head windings and by collecting electrical voltages on the reading head windings, the information (or data) track presenting positive dipoles, negative dipoles and demagnetized zones, and the reference track presenting dipoles all of the same sign, said dipoles and zones on the information track being so spaced thereon that each may be read by a reading head simultaneously with the reading of a dipole on the reference track by a reading head, and means for effecting the product of the electrical voltages simultaneously collected on a reading head winding from the information track and on a reading head winding from the reference track.

2. Apparatus for the recording of signals on a magnetic memory track comprising a two-input-electrode and two-output-electrode comparer, said comparer being capable of delivering on its two output electrodes positive and negative voltages if one furnishes to a said input electrode positive, negative and valueless (0) voltages, and to the other input electrode a valueless (0) voltage, and a commutator embodying an output terminal connected to a writing head winding, a control terminal joined to an output electrode of the comparer, a first input terminal joined to the other output terminal of the comparer, and a second input terminal receiving high-frequency alternating current voltage of mean 0 value, said commutator being capable of connecting its output terminal to said first input terminal whenever its control terminal is supplied with a voltage of a predetermined sign, and capable of connecting its output terminal to its second input terminal whenever its control terminal is supplied with a voltage of the contrary sign.

3. Apparatus according to claim 2 wherein the high-frequency voltage applied to said second input terminal of the commutator has a frequency of about 100 kilocycles.

4. Apparatus according to claim 2 wherein the commutator comprises two inverse-type transistors embodying emitters, collectors and bases, said bases being connected to each other and with the control terminal of the commutator with the aid of equal resistances, the emitter of one transistor and the collector of the other transistor being connected to each other and to the output terminal of the commutator.

5. Apparatus according to claim 2 wherein the comparer comprises two primary transistors of the same type having emitters, collectors and based, the base of each being coupled to the emitter of the other and to an input electrode of the comparer, two secondary transistors of types identical to each other, having emitters coupled to each other, collectors coupled to one common point through the intermediary of resistances and of which one is connected to an output electrode of the comparer, and bases coupled to the collectors of the two primary transistors, and a final transistor of a type identical to the secondary transistors having its emitter and its collector coupled respectively to the emitters and collectors of said secondary transistors, the base of said final transistor being connected to the collectors of said secondary transistors and to a source of voltage through resistances.

* * * * *